United States Patent
Takashima et al.

[11] Patent Number: 5,988,611
[45] Date of Patent: Nov. 23, 1999

[54] LIQUID ENCLOSING TYPE VIBRATION ISOLATING APPARATUS AND ASSEMBLING METHOD THEREOF

[75] Inventors: Yukio Takashima; Yosei Kodama, both of Osaka, Japan

[73] Assignee: Toyo Tire & Ruber Co., Ltd., Osaka, Japan

[21] Appl. No.: 08/898,593

[22] Filed: Jul. 22, 1997

[30] Foreign Application Priority Data

Jul. 26, 1996 [JP] Japan ................................. 8-197467

[51] Int. Cl.$^6$ ........................................................ F16F 9/00
[52] U.S. Cl. ................................... 267/140.13; 267/140.4
[58] Field of Search ............... 267/140.13, 141.3–141.7, 267/219; 248/550, 562, 566, 636, 638

[56] References Cited

U.S. PATENT DOCUMENTS

| | | | |
|---|---|---|---|
| 5,145,156 | 9/1992 | Muramatsu et al. | 267/140.14 |
| 5,183,243 | 2/1993 | Matsumoto | 267/140.13 |
| 5,246,212 | 9/1993 | Funahashi et al. | 267/140.13 |
| 5,501,433 | 3/1996 | Satori | 267/140.13 |
| 5,560,592 | 10/1996 | Shimoda et al. | 267/140.13 |
| 5,628,498 | 5/1997 | Nanno | 267/140.13 |
| 5,839,720 | 11/1998 | Kojiwa | 267/140.14 |

FOREIGN PATENT DOCUMENTS 8-014315  1/1996  Japan .

Primary Examiner—Chris Schwartz
Attorney, Agent, or Firm—Jordan and Hamburg LLP

[57] ABSTRACT

There is provided a liquid enclosing type vibration isolating apparatus which reduces a number of members to be aligned and which simplifies the assembling procedure in liquid, so as to reduce assembling steps and production cost. A cylindrical rubber body has a reinforcing intermediate cylinder, a concave groove and a through hole to form an orifice passage. The cylindrical rubber body is formed integrated with a diaphragm at a lower end of the cylindrical rubber body. A partitioning member has, on its peripheral part, an orifice passage concave portion. A first assembling step is conducted in air wherein a partitioning member is fitted into the cylindrical rubber body, so as to form an air chamber between the diaphragm and the partitioning member, while aligning the through hole with the orifice passage concave portion. Subsequent assembling steps are conducted in liquid wherein the cylindrical rubber body is fitted into a cup-like casing fitting and the vibration isolating base body is fitted into the cylindrical rubber body to form upper and lower liquid chambers which communicate via the orifice passage.

21 Claims, 9 Drawing Sheets

LIQUID ENCLOSING TYPE VIBRATION ISOLATING APPARATUS AND ASSEMBLING METHOD THEREOF

BACKGROUND OF THE INVENTION

The present invention relates primarily to a liquid enclosing type vibration isolating apparatus used for supporting a vibration generating body, such as a power unit of an automotive engine, while isolating vibration.

As a vibration isolating apparatus for supporting a vibration generating body, such as an automotive engine, so as not to transmit its vibration to a car body and others, there has been known a liquid enclosing type vibration isolating apparatus which is arranged so as to perform a vibration damping function and a vibration isolating function by a liquid flow effect between two liquid chambers and a vibration isolating effect of a vibration isolating base made of rubber elastic body. In the vibration isolating apparatus, a partitioning member and a diaphragm are disposed for partitioning an inner space of main body having the vibration isolating base to form upper and lower chambers whose walls are partially composed of the partitioning member and/or the diaphragm, so as to provide two liquid chambers which are charged with liquid as sealed and communicated by an orifice passage at an outer periphery of the partitioning member.

For example, JP-A-08014315 proposes a liquid enclosing type vibration isolating apparatus in which the orifice for communicating the chambers is formed separately from the partitioning member so as to simplify the shape of the partitioning member and reduce its weight and cost.

Figure 12:
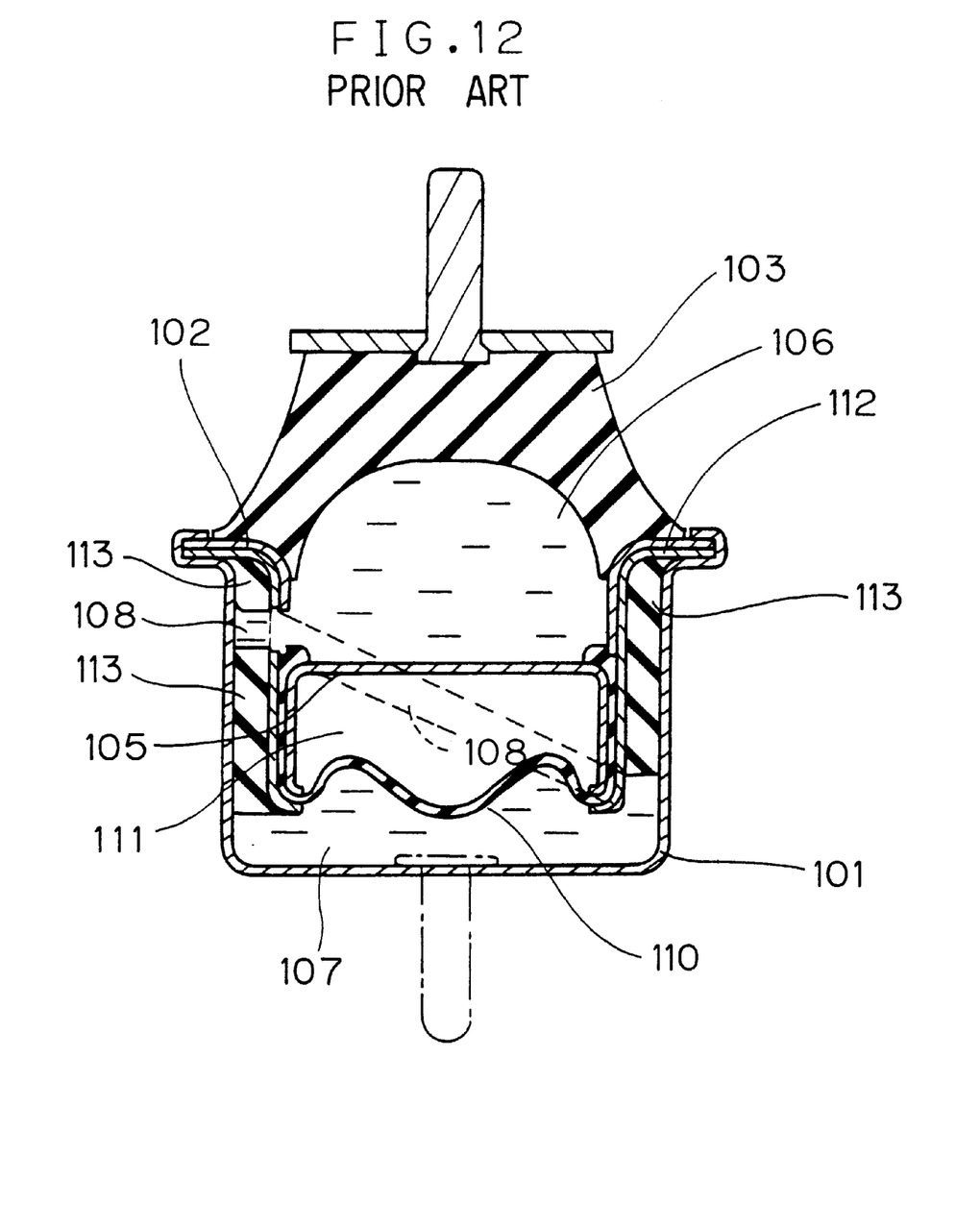
FIG. 12 is an axial section view showing one example of a prior art liquid enclosing type vibration isolating apparatus.

In FIG. 12, the proposed vibration isolating apparatus is shown. A vibration isolating base 103 is attached to an opening portion of a cylindrical fitting 101 having a bottom, in which an intermediate cylinder 112 is disposed via a cylindrical rubber elastic body 113. A partitioning member 105, formed of an inverted cup-like cylinder, is attached with a diaphragm 110 at its opening and have an air chamber 111 inside the cylinder. The partitioning member 105 is fitted into the intermediate cylinder 112. An upper liquid chamber 106, whose wall is partly composed of the vibration isolating base 103, communicates with a lower liquid chamber 107, whose wall is partly composed of the diaphragm, by an orifice passage 108 outside of the intermediate cylinder. Then, a cylindrical reinforcing fitting 102, which extends downward along the intermediate cylinder 112 so as to press the partitioning member 105, is attached to an outer periphery of a lower end of the vibration isolating base 103. A through hole which communicates from the upper liquid chamber 106 to the orifice passage 108 is provided through the reinforcing fitting 102 and the intermediate cylinder 112.

Whereas assembly of each component has to be conducted within a liquid bath to enclose liquid as sealed within the liquid enclosing type vibration isolating apparatus constructed as de scribed above, it is not easy to align and assemble each component within the liquid bath.

That is, the proposed vibration isolating apparatus has a problem in that since the through hole, which communicates the orifice passage 108 with the upper liquid chamber 106, is provided through both the intermediate cylinder 112 and the reinforcing fitting 102 of the vibration isolating base, the communication hole provided through the reinforcing fitting 102 must be accurately aligned with the through hole provided through the intermediate cylinder 112 in assembling each component within the liquid bath, thus requiring complicated jigs, leading to the increase of the cost and possible failure in the assembly.

In view of the aforementioned problems, it is an object of the present invention to provide a liquid enclosing type vibration isolating apparatus capable of reducing a number of assembling steps and the cost, by reducing a number of members which need to be aligned as much as possible, and by allowing such members to be pre-assembled within air so as to simplify the assembly within liquid.

SUMMARY OF THE INVENTION

In order to solve the aforementioned problems, a liquid enclosing type vibration isolating apparatus of the present invention has an air chamber and first and second liquid chambers communicating via an orifice passage, and has a construction in which a vibration isolating base body made of a rubber elastic material is interposed between a cup-like main fitting having a cylindrical barrel portion and a fitting that faces thereto and in which a diaphragm, made of a rubber film, and a partitioning member are disposed within the main fitting, wherein the air chamber is defined by the diaphragm and the partitioning member and is created by forming the diaphragm integrally with a cylindrical rubber body having a reinforcing intermediate cylinder therein and by fitting the partitioning member within an inner peripheral face of the cylindrical rubber body. The first liquid chamber, defined by the diaphragm and bottom of the cup-like main fitting, is created by fitting the cylindrical rubber body within the cylindrical barrel portion of the cup-like main fitting. The second liquid chamber, defined by the partitioning member and the vibration isolating base body, is created by fitting an outer periphery of the vibration isolating base body to an opening portion of the cylindrical rubber body and by press-contacting a lower end of the vibration isolating base body to a peripheral part of the partitioning member. The orifice passage is provided at an outer periphery of the cylindrical rubber body such that the orifice passage starts from a through hole, which opens into the second liquid chamber and leads to the first liquid chamber; and a communicating concave portion which is aligned with the through hole is provided at the peripheral part of the partitioning member.

The arrangement of the inventive liquid enclosing type vibration isolating apparatus described above allows the assembling works for forming the air chamber between the diaphragm and the partitioning member to be readily carried out in air. In detail, the works for fitting the partitioning member into the cylindrical rubber body which is integrally formed with the diaphragm and the works for aligning them at that time, e.g., the works for aligning the through hole of the cylindrical rubber body with the concave portion of the partitioning member, are readily carried out in air.

Further, because the members which need to be aligned are only the partitioning member and the cylindrical rubber body, the assembling works, such as the fitting of the cylindrical rubber body into the cylindrical barrel portion of the main fitting, the fitting of the vibration isolating base into the opening portion of the cylindrical rubber body and the connection by way of caulking, may be readily carried out without aligning within the liquid bath and without using a special jig. Further, the length and sectional area of the concave groove at the outer periphery of the cylindrical rubber body, which forms the orifice passage, may be readily changed without involving changes of design of other members such as the main fitting.

According to an embodiment of the liquid enclosing type vibration isolating apparatus of the present invention, a ringed reinforcing fitting is provided at the outer periphery of the vibration isolating base and is connected by caulking with a ringed stopper fitting, provided so as to restrict displacement of the fitting, together with the main fitting and opening-end portion of the intermediate cylinder.

When the reinforcing fitting at the outer periphery of the vibration isolating base body, the cup-like main fitting and the opening-end portion of the intermediate cylinder are connected by caulking of the ringed stopper member, the connection between the vibration isolating base body and the main fitting is strong, and the stopper will not come off because the stopper fitting is ringed and performs the stopping effect by the whole circumference thereof.

A method for assembling a liquid enclosing type vibration isolating apparatus comprises steps of forming a cylindrical rubber body having a reinforcing intermediate cylinder therein, which is integrated with a diaphragm and has a concave groove for an orifice passage which starts from a through hole at outer periphery of the cylindrical rubber body and leads to a vicinity of the diaphragm; fitting a partitioning member, having a communicating concave portion at a peripheral part thereof, to an inner periphery of the cylindrical rubber body which is integral with the diaphragm so as to align the through hole with the concave portion during assembly in air, and thereby pre-assembling so as to create an air chamber defined by the diaphragm and the partitioning member; press-fitting the cylindrical rubber body to a cylindrical barrel portion of the main fitting leading with the side of the diaphragm, within a liquid bath; fitting an opening side of the main fitting and the cylindrical rubber body to an outer periphery of a vibration isolating base disposed in advance within a ringed stopper fitting; and connecting them integrally by caulking of a stopper fitting. In this way first and second liquid chambers, in which liquid is enclosed and sealed and which communicate via the orifice passage at the outer periphery of the cylindrical rubber body, are formed between the diaphragm and the bottom of the main fitting and between the partitioning member and the vibration isolating base.

The specific nature of the invention, as well as other objects, uses and advantages thereof, will clearly appear from the following description and from the accompanying drawings in which like numeral refer to like parts.

DETAILED DESCRIPTION

Preferred embodiments of the present invention are explained below with reference to the drawings.

Figure 1:
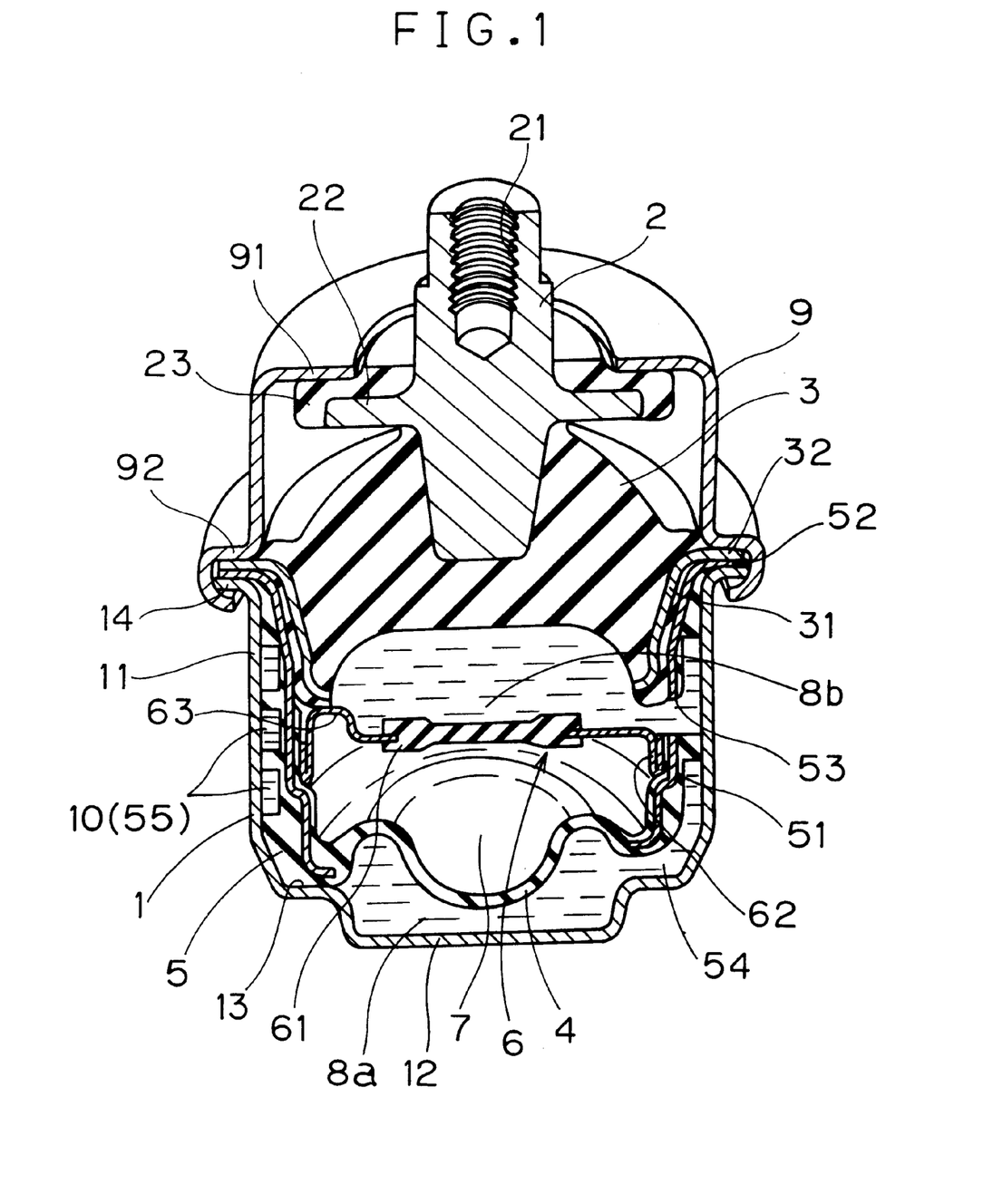
FIG. 1 is an axial sectional perspective view of a liquid enclosing type vibration isolating apparatus according to one embodiment of the present invention.

Referring to FIG. 1, one example of a liquid enclosing type vibration isolating apparatus of the present invention is shown. In this specification, the upper part shown in FIG. 1 is presented as the upper part for convenience of explanation. The apparatus may be put up-side-down or may be inclined in the horizontal direction, depending on a mode of use.

A cup-like casing fitting 1 serves as a lower supporting fitting and also serves as a casing of the liquid enclosing type vibration isolating apparatus. A top-like fixture 2 serves as an upper supporting fitting and has a screw hole 21 for anchoring a bolt. The top-like fixture 2 has the same axis as the cup-like casing fitting 1 and is facing to an opening of the cup-like casing fitting 1. Either one of the cup-like casing fitting 1 or the top-like fixture 2 is connected with a vibration generating body such as an automotive engine. Usually, the top-like fixture 2 is connected with the vibration generating body and the cuplike casing fitting 1 is connected with the car body.

A thick vibration isolating base 3 is made of a rubber elastic material and interposed between the cup-like casing fitting 1 and the top-like fixture 2. A diaphragm 4 is formed of a rubber film. The diaphragm 4 is connected to a lower end of a cylindrical rubber body 5 fitted within an inner peripheral face of the cup-like casing fitting 1 and is formed integrally with the cylindrical rubber body 5. A partitioning member 6 is fitted within the inner peripheral face of the cylindrical rubber body 5. A space is defined by a lower face of the vibration isolating base 3, the inner peripheral face of the cylindrical rubber body 5 and a bottom face of the cup-like casing fitting 1. This space is partitioned into an air chamber 7, located at center of the space, and upper and lower liquid chambers 8b and 8a, located above and beneath of the air chamber 7 respectively, by the partitioning member 6 and the diaphragm 4 thereunder.

Figure 2:
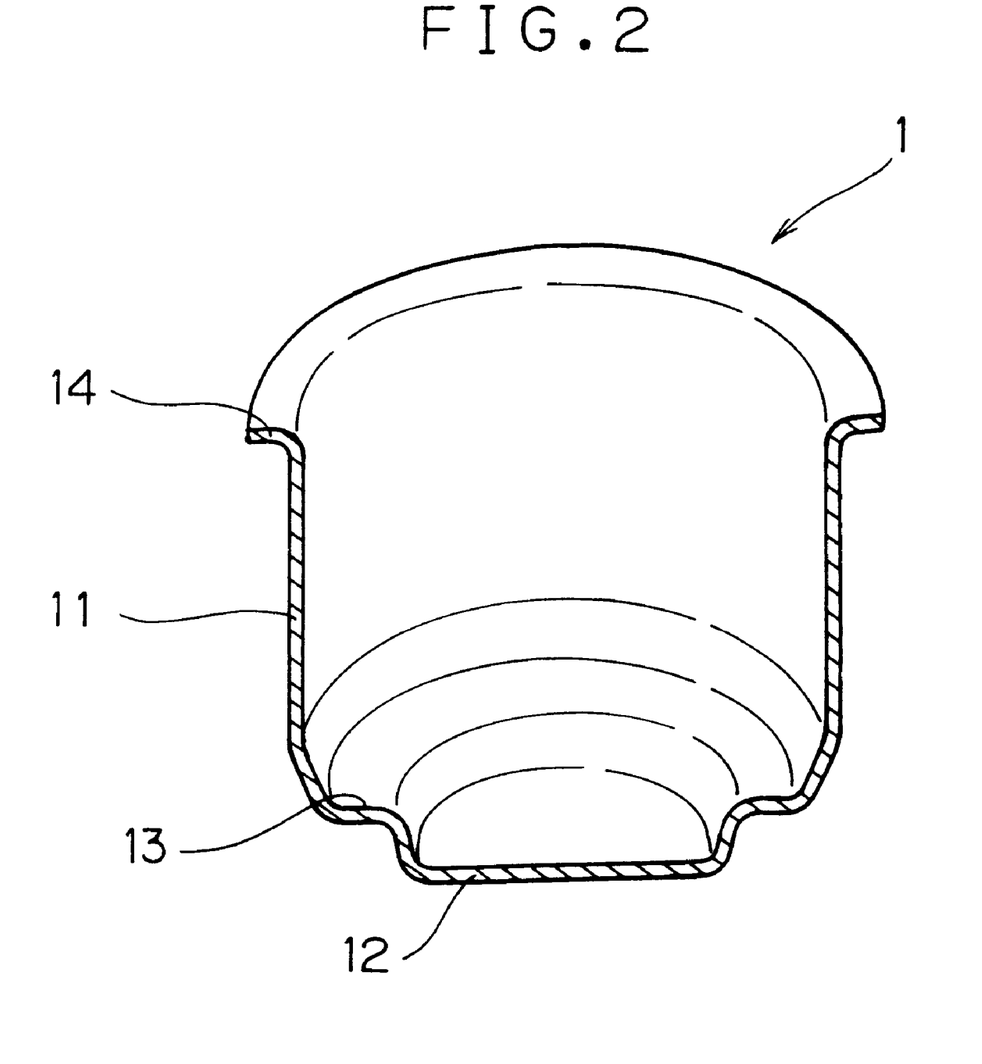
FIG. 2 is an axial sectional perspective view of a cup-like casing fitting.

As shown in FIG. 2, the cup-like casing fitting 1 has a bottom 12, a cylindrical barrel portion 11 extending upward from the bottom 12 via a stepped portion 13, and a flange 14 extending over a whole circumference of an upper end of the casing fitting 1. Although not shown, the cup-like casing fitting 1 may be attached with a fixing bracket or a bolt.

Figure 3:
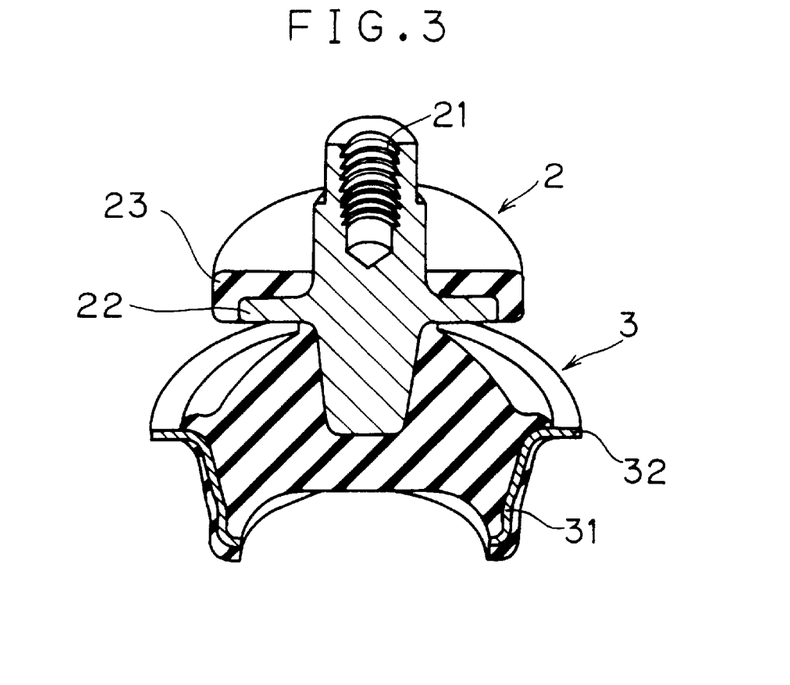
FIG. 3 is an axial sectional perspective view of a top-like fixture and a vibration isolating base which are integrated with each other.

As shown in FIG. 3, the top-like fixture 2 has a shape of a flange toy-top and has a stopper 22 which protrudes outwardly over the whole circumference. A bolt may be anchored in a screw hole 21 by means of press-fit or welding. The stopper 22 has a rubber elastic body 23 for relieving a shock when abutting with an inner flange 91 of a stopper fitting 9 described below.

As shown in FIG. 3, the vibration isolating base 3 has nearly a shape of umbrella. The top-like fixture 2 is embedded in a top of the vibration isolating base 3. A cylindrical auxiliary fitting 31, having an inverted taper, is embedded in a lower-part-outer periphery of the vibration isolating base 3. Protruding outwardly from an upper end of the auxiliary fitting 31 is a flange 32 having almost the same shape as the flange 14 of the cup-like casing fitting 1. During vulcanization-molding of the vibration isolating base 3, the top-like fixture 2 and the auxiliary fitting 31 are embedded in or adhered to the vibration isolating base 3.

Figure 4:
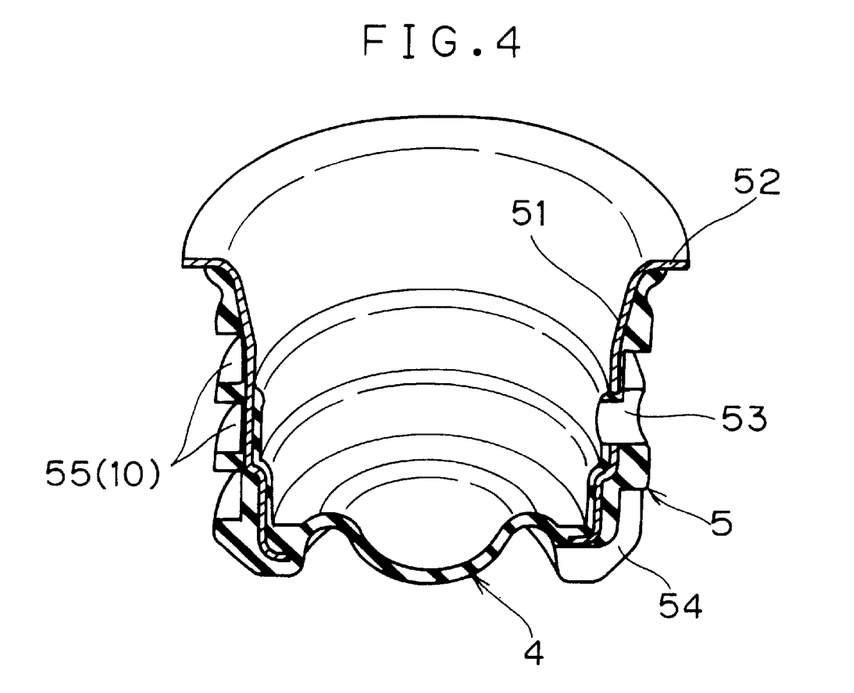
FIG. 4 is an axial sectional perspective view of a diaphragm and a cylindrical rubber body which are integrated with each other.

As shown in FIG. 4, the diaphragm 4 is formed integrated with the cylindrical rubber body 5 in which a reinforcing intermediate cylinder 51 is embedded.

As shown in FIG. 1, the cylindrical rubber body 5 is fitted hermetically to the inner periphery of the cylindrical barrel portion 11 with the diaphragm 4 formed at the lower end. The lower end of the cylindrical rubber body 5 abuts and engages with the stepped portion 13 of the cup-like casing fitting 1, so that the liquid chamber 8a is formed as defined by the diaphragm 4 and the bottom 12 of the cup-like casing fitting 1 below the diaphragm 4.

Figure 5:
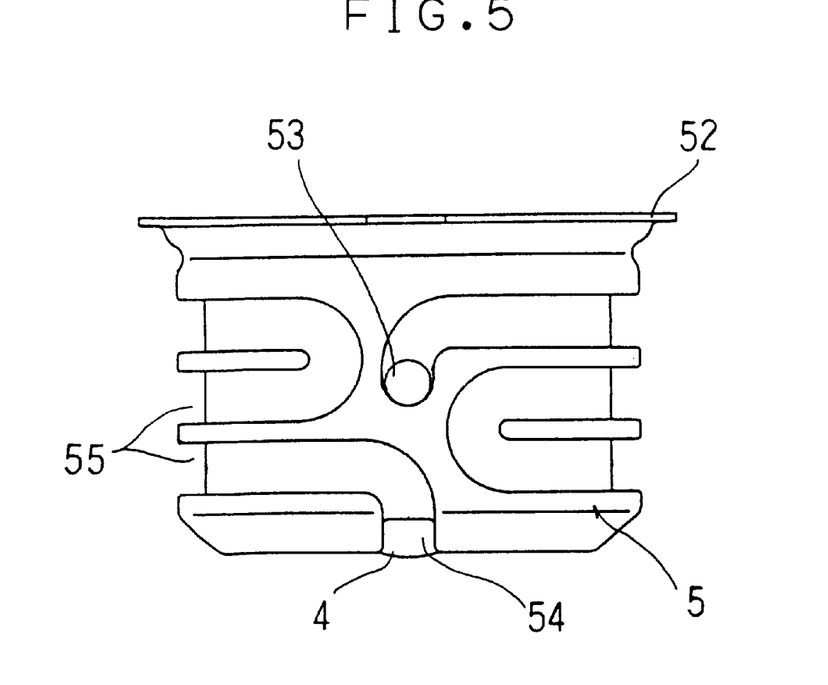
FIG. 5 is a side view of the cylindrical rubber body.

As shown in FIGS. 4 and 5, a concave groove 55 is provided at the outer periphery of the cylindrical rubber body 5, outside of the intermediate cylinder 51.

As shown in FIG. 1, when the cylindrical rubber body 5 is fitted into the cylindrical barrel portion 11, the concave groove 55 forms an orifice passage 10. At one end of the orifice passage 10 is a through hole 53 in the cylindrical rubber body 5, located above the partitioning member 6. At another end of the orifice passage 10 is a communication port 54 that opens into the lower liquid chamber 8a below the diaphragm 4. The orifice passage 10 allows liquid enclosed within the upper and lower liquid chambers 8b and 8a to flow and communicate between the upper and lower liquid chambers 8b and 8a.

As shown in FIG. 5, the concave groove 55 for the orifice passage 10 extends from the through hole 53, in the direction of circumference of the cylindrical rubber body 5. After extending approximately once around the circumference, the orifice passage 10 is turned back, so as to form a zigzag shape and, so as to have a length of two turns or more. The length and sectional area of the concave groove 55, i.e., those of the orifice passage 10, may be adequately set in accordance with a vibration isolating characteristic. Required changes for adjusting the length merely involves changing a mold for forming the cylindrical rubber section 5.

As shown in FIG. 1, the partitioning member 6 is fitted into the inner periphery of the cylindrical rubber section 5. In this way, the air chamber 7 is formed to be air tight as defined by the partitioning member 6 and the diaphragm 4.

Figure 6:
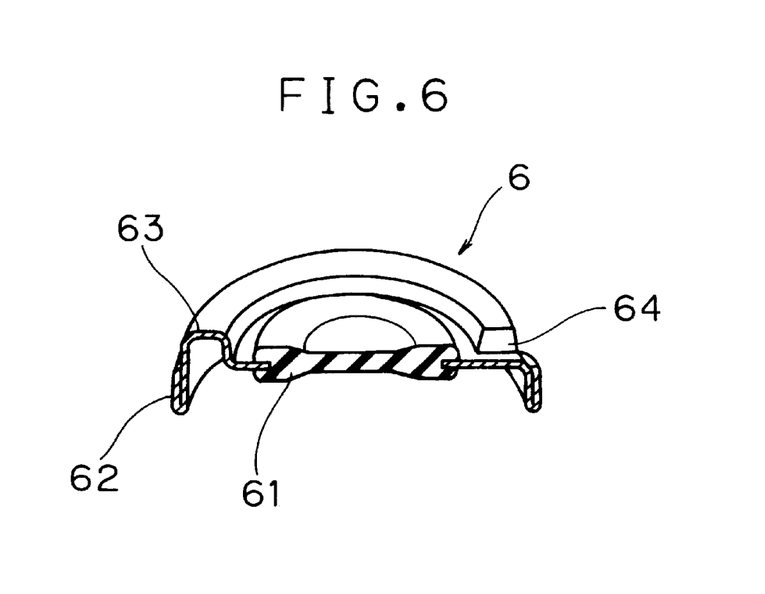
FIG. 6 is an axial sectional perspective view of a partitioning member.
Figure 7:
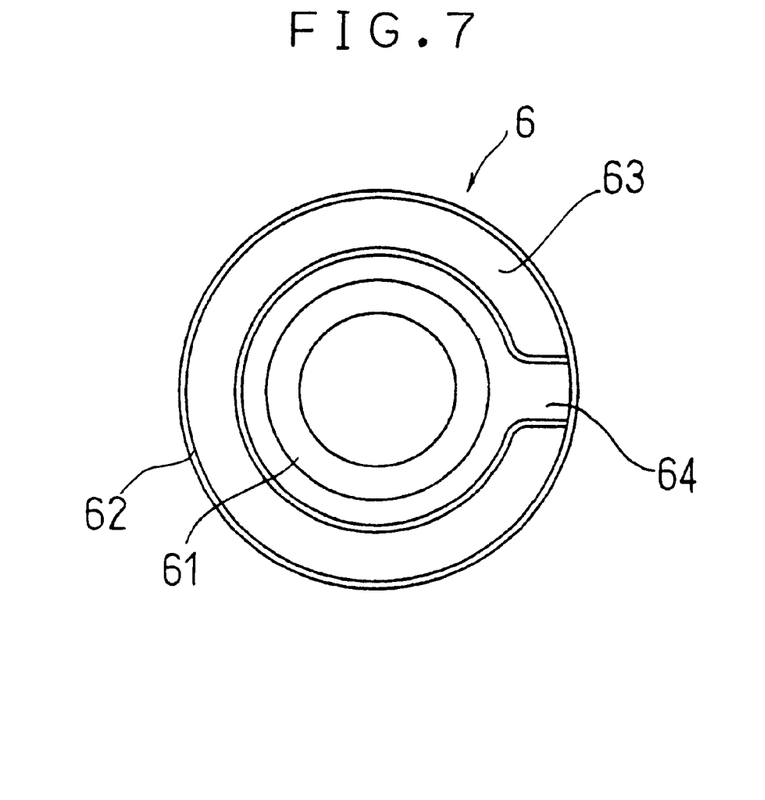
FIG. 7 is a plan view of the partitioning member.

As shown in FIGS. 6 and 7, the partitioning member 6 is formed of a press-molded metal plate such as a steel plate, having a center opening to which a rubber member 61 is attached. The partitioning member 6 may be formed as an integrally molded product. As shown in FIG. 1, a cylindrical portion 62 at the outer periphery of the partitioning member 6 is fitted hermetically into the inner periphery of the intermediate cylinder 51 of the cylindrical rubber body 5 by a sealing rubber layer on the inner periphery of the intermediate cylinder 51.

As shown in FIGS. 6 and 7, a communicating concave portion 64 is provided at the peripheral part of the partitioning member 6 which abuts on the vibration isolating base 3 and the cylindrical rubber body 5. When the partitioning member 6 is fitted to the cylindrical rubber body 5, the concave portion 64 is aligned with the through hole 53 so as to effect communication through the concave portion 64 and the through hole 53.

Figure 8:
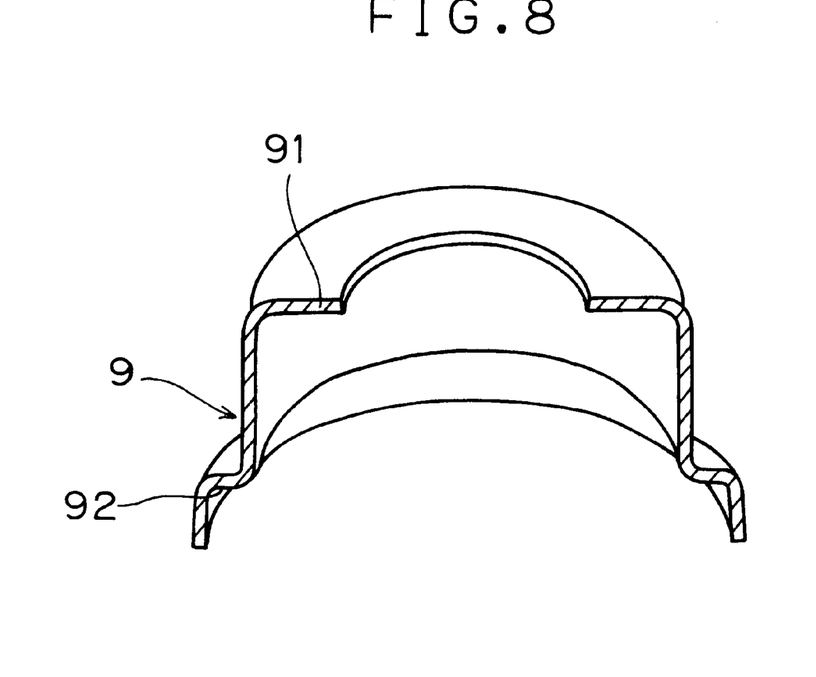
FIG. 8 is an axial sectional perspective view of a reversed-cup-like stopper fitting.

As shown in FIG. 8, the stopper fitting 9 has a stopping inner flange 91 which projects inwardly at an upper end thereof. At a lower end thereof, the stopper fitting 9 has a stepped portion 92 which serves for connection-by-caulking with an upper end of the cup-like casing fitting 1.

As shown in the upper part in FIG. 1, the inner flange 91 of the stopper fitting 9 extends above the stopper 22 of the top-like fixture 2. When the top-like fixture 2 is displaced largely upward due to vibration, the stopper 22 abuts on the flange 91 over the whole circumference so as to achieve a stopper effect.

As shown in the middle part in FIG. 1, into the opening of the cylindrical barrel portion 11 of the cup-like casing fitting 1 and the cylindrical rubber body 5, an outer periphery of the vibration isolating base 3 described above is inserted until the lower end thereof abuts on a peripheral part 63 of the partitioning member 6 which peripheral part projects toward the vibration isolating base. The flange 32 of the auxiliary fitting 31 and a flange 52 at the upper end of the intermediate cylinder 51 of the cylindrical rubber body 5 is engaged with the flange 14 of the cup-like casing fitting 1. These flanges 32, 52, 14 are caulked to be integrated over the whole circumference thereof by the lower end of the ringed stopper fitting 9.

Thereby, the cup-like casing fitting 1 is connected with the vibration isolating base 3 while a space between the vibration isolating base 3 and the partitioning member 6 is created as the liquid chamber 8b.

Figure 9:
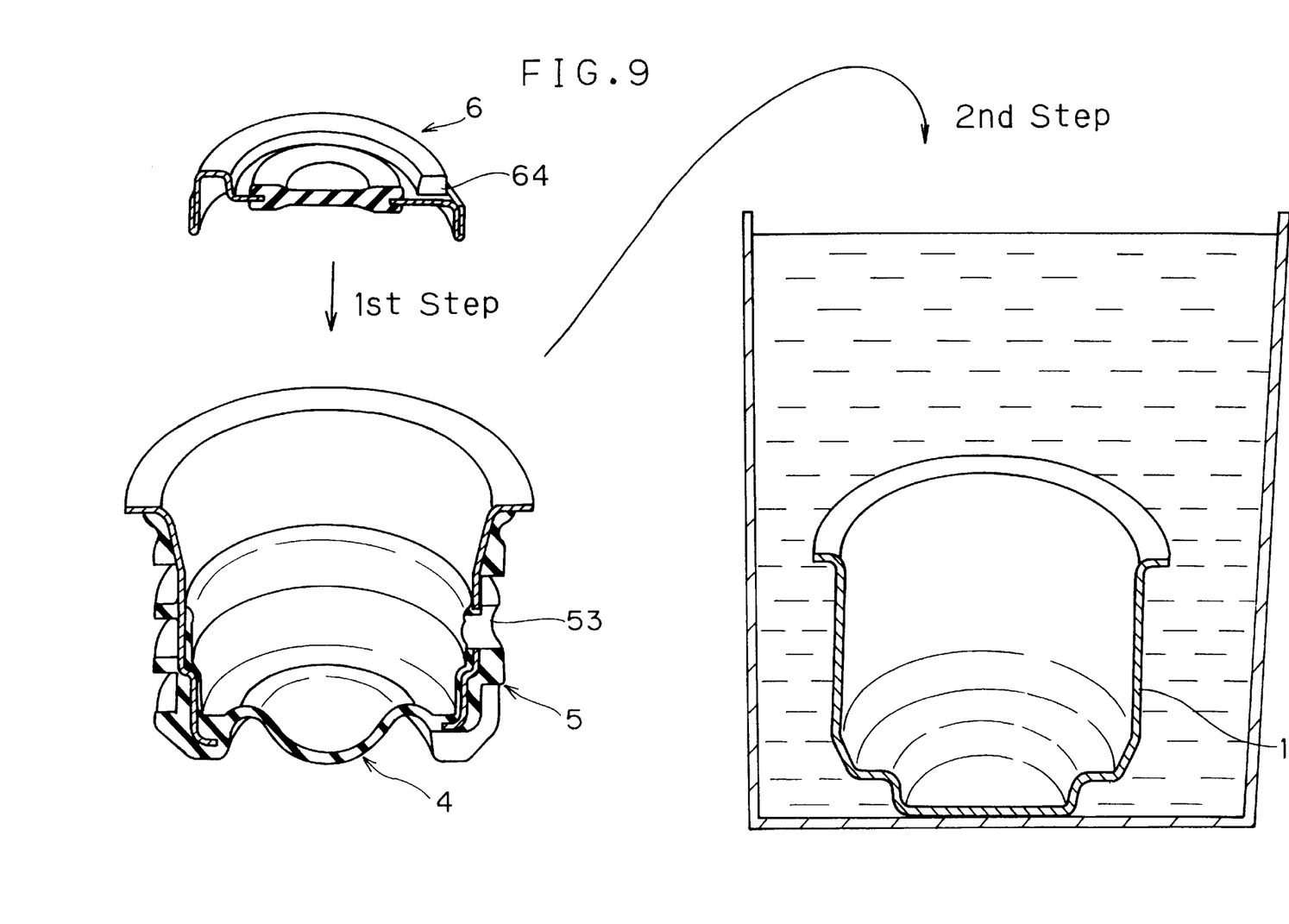
FIG. 9 is an axial sectional perspective view for diagrammatically explaining first and second steps in a method for assembling the liquid enclosing type vibration isolating apparatus.
Figure 10:
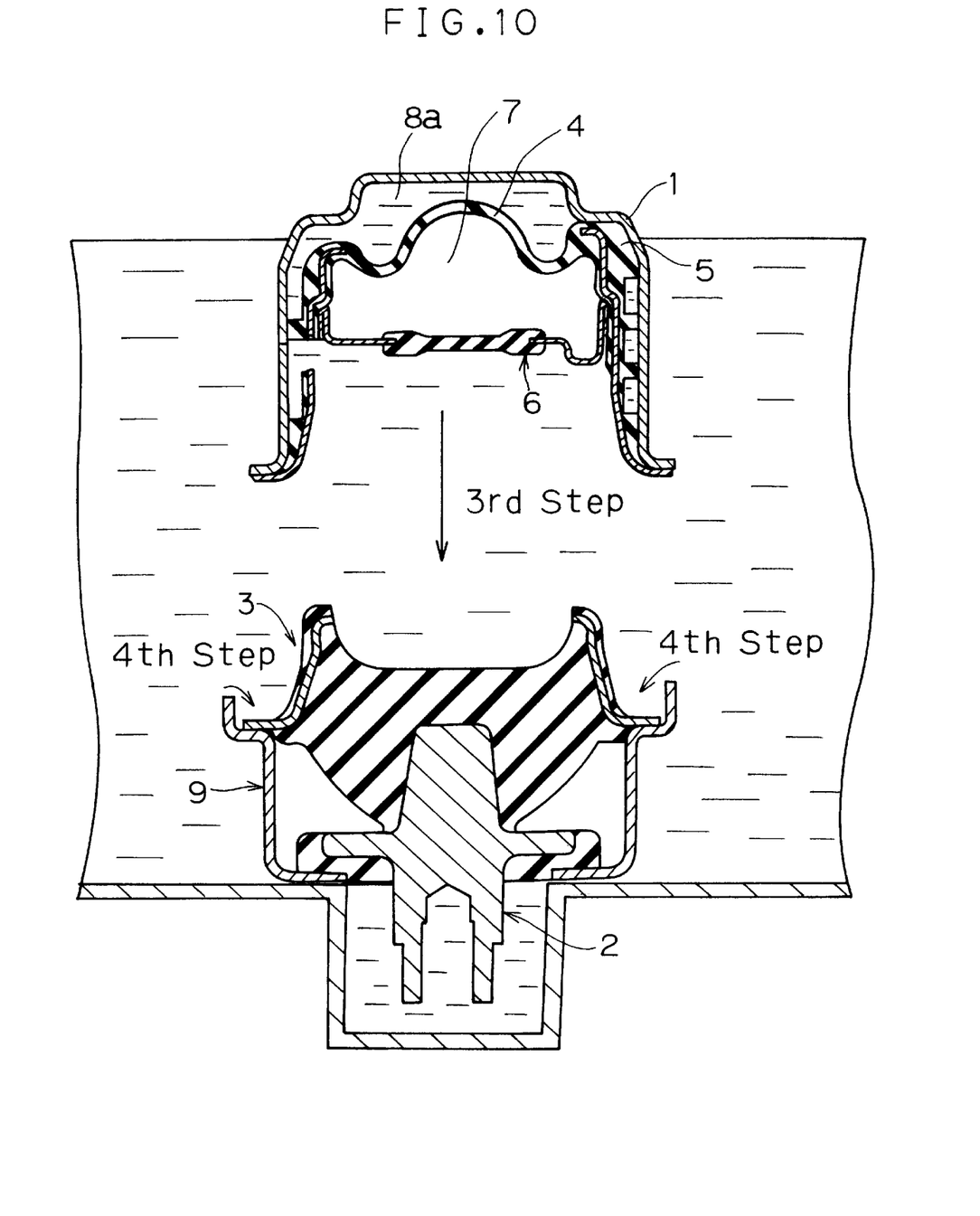
FIG. 10 is an axial section view for diagrammatically explaining third and fourth steps in of the method for assembling the liquid enclosing type vibration isolating apparatus.

The liquid enclosing type vibration isolating apparatus constructed as described above is assembled through first through fourth steps as shown in FIGS. 9 and 10.

In Step 1 (a left half part of FIG. 9), the partitioning member 6 is fitted to the cylindrical rubber body 5 in air while aligning a communicating concave portion 64 in the partitioning member 6 with the through hole 53 in the cylindrical rubber body 5, so as to form the air chamber 7 defined by the diaphragm 4 and the partitioning member 6. At this time, the alignment and the fitting may be readily carried out because they are done in air.

In Step 2 (a right half part of FIG. 9), the cylindrical rubber body 5 assembled with the partitioning member 6, as described above, is press-fitted to the cylindrical barrel portion 11 of the cup-like casing fitting 1 within a liquid bath. At this time, the cylindrical rubber body 5 is insert into the cup-like casing fitting 1 with its diaphragm 4 leading. Thus, the liquid chamber 8a, in which liquid is hermetically enclosed, is formed as defined by the diaphragm 4 and the bottom 12 of the cup-like casing fitting 1.

In Step 3 (FIG. 10), the ringed stopper fitting 9 and the vibration isolating base 3, which is disposed into the ringed stopper fitting 9, are set in advance within a liquid bath up-side-down as shown. Then the opening portion of the cup-like casing fitting 1, fitted with the cylindrical rubber body 5, is fitted from above to the outer periphery of the vibration isolating base 3 to cover it.

In Step 4, the flange 52 of the intermediate cylinder 51 and the flange 14 of the cup-like casing fitting 1 are placed on the stepped portion 92 before caulking at the opening of the stopper fitting 9. Then, the whole circumference of an opening edge of the stopper fitting 9 is caulked with the flanges 51, 52.

Thus, the liquid enclosing type vibration isolating apparatus constructed as shown in FIG. 1 may be readily assembled and constructed, in which liquid is enclosed as sealed in the liquid chamber 8a defined by the diaphragm 4 and the bottom 12 of the cup-like casing fitting 1 and in the liquid chamber 8b defined by the partitioning member 6 and the vibration isolating base 3, respectively, and in which these liquid chambers communicate with each other through the orifice passage 10 at the outer periphery of the cylindrical rubber body 5.

The assembling method described above eliminates need for alignment in the circumferential direction between the cylindrical rubber body 5 and the cylindrical barrel portion 11 of the cup-like casing fitting 1 and between the vibration isolating base 3 or the stopper fitting 9 and the opening portion of the cup-like casing fitting 1 or the cylindrical rubber body 5. For this reason, the assembling method eliminates need for a special jig for the alignment and allows easy fitting for assembling, thus allowing the cost for assembling to be reduced.

Figure 11:
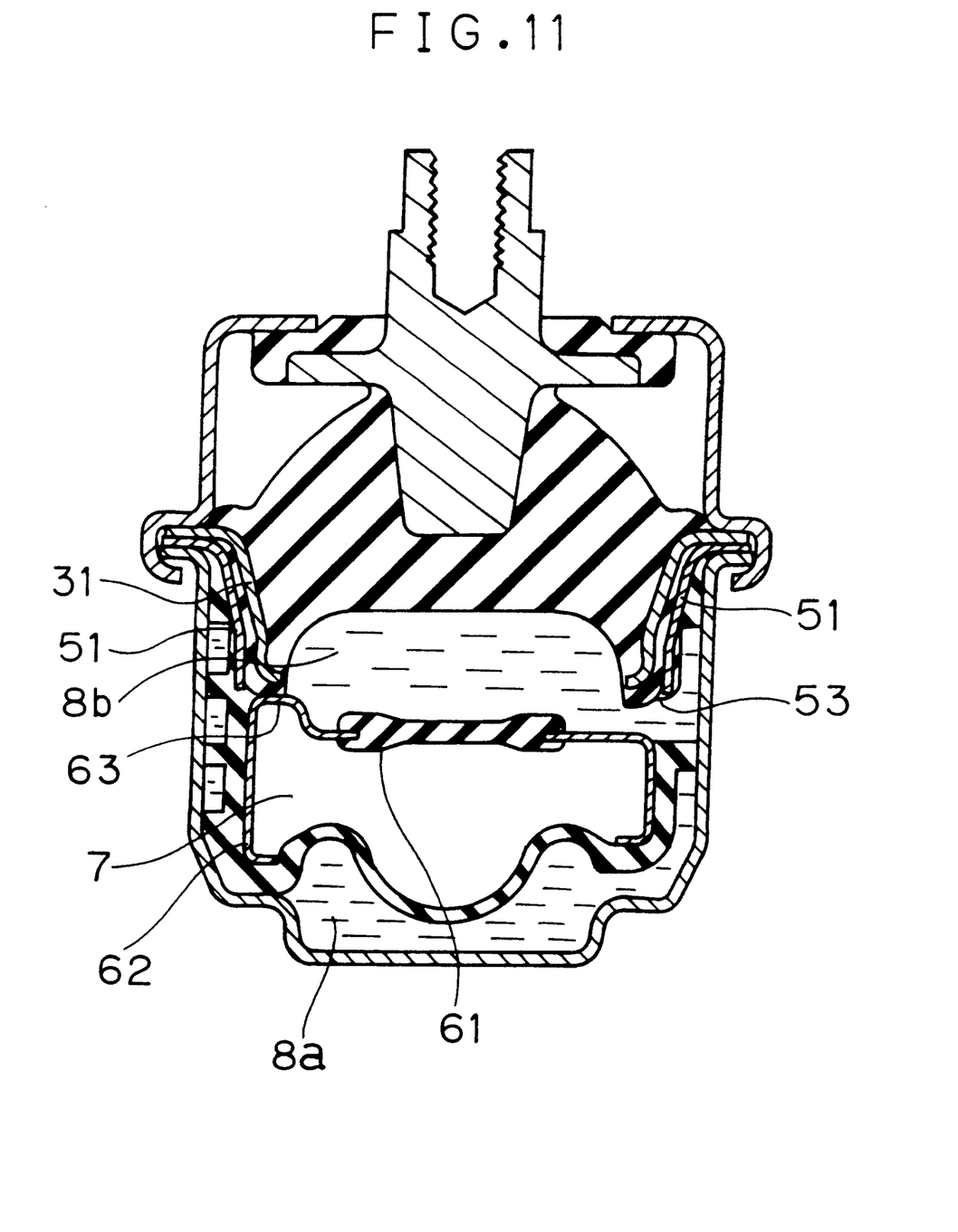
FIG. 11 is an axial section view showing a liquid enclosing type vibration isolating apparatus according to another embodiment.

FIG. 11 shows a liquid enclosing type vibration isolating apparatus according to another embodiment.

In the embodiment described above, the reinforcing intermediate cylinder 51 of the cylindrical rubber body 5 is extended almost to the position where it abuts on the stepped portion 13 near the bottom of the cup-like casing fitting 1 and serves to reinforce the outer periphery of the diaphragm 4. Meanwhile, in the present embodiment, the cylindrical portion 62 of the partitioning member 6 is extended to the outer periphery of the diaphragm 4 to exert an shape-retaining effect. It allows the intermediate cylinder 51 to be formed in a length ranging from an opening-side end of the cylindrical rubber body 5 to the upper end of the through hole 53. Accordingly, the through hole 53 need not penetrate through the intermediate cylinder 51, allowing the cost to be lowered further.

Also in the embodiment of the liquid enclosing type vibration isolating apparatus shown in FIG. 11, because the cylindrical rubber body 5 is formed as integrated with the diaphragm 4 and may be aligned and assembled with the partitioning member 6 in air and because the cylindrical rubber body 5 may be press-fitted and caulked without aligning within the liquid bath, in the same manner as described above, the liquid enclosing type vibration isolating apparatus may be assembled readily.

As described above, according to the liquid enclosing type vibration isolating apparatus, because the members which need to be aligned in assembling the apparatus are only the cylindrical rubber body, which is integral with the diaphragm and the partitioning member, and because the cylindrical rubber body and the partitioning member are assembled in air, these members are aligned readily while the assembly in the liquid bath is simplified without requiring a special jig, thus reducing the number of assembling steps and the cost.

Further, because the orifice passage is provided at the outer periphery of the cylindrical rubber separately from the partitioning member, length and sectional area size of the orifice passage may be easily changed without involving changes of design of other members such as the main fitting.

While preferred embodiments have been described, variations thereto will occur to those skilled in the art and are considered to be within the scope and spirit of the present invention as delineated by the following claims.

What is claimed is:

1. A liquid filled vibration isolating apparatus having an air chamber and first and second liquid chambers communicating via an orifice passage, comprising:

a casing fitting including a cylindrical barrel portion and a bottom forming a cup configuration with a casing opening defined at an open end of said cylindrical barrel portion;

a cover fitting disposed at said casing opening;

a vibration isolating base body formed of an elastic material and interposed between said cover fitting and said casing fitting, said vibration isolating base body having an end outer peripheral surface and an end peripheral surface;

a cylindrical elastic body having a reinforcing cylinder integrated therein, a diaphragm, formed of a elastic film, closing a first end of the cylindrical elastic body, and a second end defining a cylindrical body opening, said diaphragm being integrally formed with the cylindrical elastic body;

said cylindrical elastic body being disposed in said casing fitting between said bottom of said casing fitting and said vibration isolating base body with said diaphragm adjacent said bottom of said casing fitting;

a partitioning member disposed within said cylindrical elastic body and sealingly engaging an inner peripheral surface of said cylindrical elastic body, said partitioning member being disposed between said diaphragm and said vibration isolating base body;

said air chamber being defined by said diaphragm and said partitioning member;

said first liquid chamber being defined by said diaphragm and said bottom of said casing fitting by said cylindrical elastic body being inserted in and engaging an inner surface of the cylindrical barrel portion of said casing fitting;

said second liquid chamber being defined by said partitioning member and said vibration isolating base body wherein said end outer peripheral surface of said vibration isolating base body sealingly engages an inner peripheral face of said cylindrical body opening of said cylindrical elastic body and said end peripheral surface of said vibration isolating base body sealingly engages a peripheral circumferential surface of said partitioning member;

said partitioning member having a concavity in said peripheral circumferential surface defining, in conjunction with said end peripheral surface of said vibration isolating base body, an opening of said second liquid chamber extending radially outward with respect to said tubular casing axis; and said cylindrical elastic body having a through hole aligned with said opening of said second liquid chamber and a channel on an outer peripheral surface of said cylindrical elastic body communicating said opening of said second liquid chamber via said through hole to said first liquid chamber.

2. The liquid filled vibration isolating apparatus according to claim 1, further comprising:

a reinforcing fitting in a form of one of a ring or a cylinder provided at an outer periphery of said vibration isolating base;

said reinforcing fitting having a flange;

said reinforcing cylinder of said cylindrical rubber body having a flange at said cylindrical body opening;

said casing fitting having a flange at said casing opening;

a ringed stopper fitting for restricting displacement of the cover fitting; and said ringed stopper fitting having an portion caulked to connect said flange of said reinforcing fitting of said vibration isolating base, said flange of said reinforcing cylinder of said cylindrical rubber body and said flange of said casing fitting.

3. A method for assembling a liquid filled vibration isolating apparatus having an air chamber and first and second liquid chambers communicating via an orifice passage, comprising the steps of:

providing a casing fitting including a cylindrical barrel portion and a bottom forming a cup configuration with a casing opening defined at an open end of said cylindrical barrel portion;

providing a stopper fitting for disposal at said casing opening;

providing a vibration isolating base body formed of an elastic material for interposition between said cover fitting and said casing fitting, said vibration isolating base body having an end outer peripheral surface and an end peripheral surface;

forming a cylindrical elastic body integrally with a diaphragm closing an end of said cylindrical elastic body and with a reinforcing cylinder therein and providing a through hole in said cylindrical elastic body and a concave groove on an outer surface of said cylindrical elastic body for defining said orifice passage, said concave groove extending from said through hole to a vicinity of said diaphragm;

providing a partitioning member having a peripheral surface, for engagement with said end peripheral surface of said vibration isolating base body, with a concave portion in said peripheral surface for defining an opening in conjunction with said end peripheral surface when said peripheral surface is engaged with said end peripheral surface;

fitting, in a gas filled environment, said partitioning member, through an cylindrical elastic body open end of said cylindrical body, into said cylindrical elastic body such that said partitioning member sealingly engages an inner periphery of said cylindrical elastic body, said through hole is aligned with said concave portion so as to form said air chamber between said diaphragm and said partitioning member, and said peripheral surface faces said cylindrical elastic body open end;

press-fitting, in a liquid environment, said cylindrical elastic body, with said partitioning member fitted therein, into said cylindrical barrel portion of said casing fitting with said diaphragm entering said cylindrical barrel portion first so as to form said first liquid chamber between said bottom of said casing fitting and said diaphragm and to form said orifice passage as defined by said concave groove and said cylindrical barrel portion;

fitting, in a liquid environment, said casing opening of said casing fitting press-fitted with said cylindrical rubber body, to engage an outer peripheral surface of said vibration isolating base body with said casing opening and to engage said end peripheral surface of said vibration isolating base body with said peripheral surface of said partitioning member to form said second liquid chamber and said opening which communicates with said second liquid chamber, via said orifice passage, with said first liquid chamber; and caulking said stopper fitting to connect said casing fitting and said reinforcement cylinder.

4. A vibration isolating apparatus having first and second liquid chambers, comprising:

a tubular casing having a tubular casing axis, a first casing end, a second casing end, and a tubular casing inner surface;

a casing bottom closing said first casing end;

a tubular body member having a first tubular body end, a second tubular body end, an outer tubular body surface, and an inner tubular body surface, said tubular body member defining an orifice;

an elastic diaphragm sealing said first tubular body end;

said tubular body member being disposed in said tubular casing with said outer tubular body surface engaging said tubular casing inner surface, and said casing bottom opposing said elastic diaphragm to define said first liquid chamber therebetween;

a partition member, disposed in said tubular body member, having opposing first and second partition surfaces, said partition member sealingly engaging said inner tubular body surface to define an air chamber within said tubular body member and between said first partition surface and said elastic diaphragm;

said second partition surface having a partition peripheral portion;

an elastic base body having base end with an end peripheral portion disposed within said tubular body member and engaging said partition periphery of said second partition surface to define a second liquid chamber between said partition member and said base end;

said partition peripheral portion having a concavity aligned with said orifice in said tubular body member, said concavity defining an opening in conjunction with said end peripheral portion which permits said second liquid chamber to communicate with said orifice;

said outer tubular body surface of said tubular body member having a groove extending from said orifice to said first liquid chamber defining a conduit, in conjunction with said tubular casing inner surface, said conduit communicating said first liquid chamber with said second liquid chamber; and said tubular casing defining a support point and said elastic base body defining a support point.

5. The vibration isolating apparatus according to claim 4 wherein said tubular body member is formed, at least in part, of an elastic material.

6. The vibration isolating apparatus according to claim 5 wherein said tubular body member has a rigid tubular reinforcement with said elastic material covering at least a portion thereof.

7. The vibration isolating apparatus according to claim 6 wherein said elastic material is disposed to form said outer tubular body surface, said groove is formed in said elastic material, and said elastic material is in sealing engagement with said tubular casing inner surface to define said conduit.

8. The vibration isolating apparatus according to claim 4 wherein:

said tubular body member includes a rigid tubular reinforcement and an elastic material molded over said rigid tubular reinforcement to form at least a portion of said outer tubular body surface; and said groove is formed in said elastic material and said elastic material is in sealing engagement with said tubular casing inner surface to define said conduit.

9. The vibration isolating apparatus according to claim 8 wherein:

said rigid tubular reinforcement has a tubular body flange extending radially outward with respect to said tubular casing axis at said second tubular body end;

said tubular casing has a casing flange extending radially outward with respect to said tubular casing axis at said second casing end and engaging said tubular body flange; and a fixing device fixes together said tubular body flange and said casing flange.

10. The vibration isolating apparatus according to claim 9 wherein:
   said elastic base body has a base body flange extending radially outward with respect to said tubular casing axis from said elastic base body; and
   said base body flange is held together along with said tubular body flange and said casing flange by said fixing device.

11. The vibration isolating apparatus according to claim 10 wherein:
   said elastic base body has a rigid base body reinforcement embedded in said elastic base body; and
   said rigid base body reinforcement includes said base body flange.

12. The vibration isolating apparatus according to claim 11 wherein said fixing device is an annular stepped member having a first annular portion extending radially with respect to said tubular casing axis and a second ring portion extending axially with respect to said tubular casing axis, said second ring portion being swaged to hold together said base body flange, said tubular body flange and said casing flange against said first annular portion.

13. The vibration isolating apparatus according to claim 8 wherein:
   said tubular casing has a casing flange extending radially outward with respect to said tubular casing axis at said second casing end;
   said elastic base body has a base body flange extending radially outward from said elastic base body and with respect to said tubular casing axis; and
   a fixing device fixes together said casing flange and said base body flange.

14. The vibration isolating apparatus according to claim 13 wherein:
   said elastic base body has a rigid base body reinforcement embedded in said elastic base body; and
   said rigid base body reinforcement includes said base body flange.

15. The vibration isolating apparatus according to claim 14 wherein said fixing device is an annular stepped member having a first annular portion extending radially with respect to said tubular casing axis and a second ring portion extending axially with respect to said tubular casing axis, said second ring portion being swaged to hold together said base body flange and said casing flange against said first annular portion.

16. The vibration isolating apparatus according to claim 4 wherein:
   said tubular body has a tubular body flange extending radially outward with respect to said tubular casing axis at said second tubular body end;
   said tubular casing has a casing flange extending radially outward with respect to said tubular casing axis at said second casing end and engaging said tubular body flange; and
   a fixing device fixes together said tubular body flange and said casing flange.

17. The vibration isolating apparatus according to claim 16 wherein said fixing device is an annular stepped member having a first annular portion extending radially with respect to said tubular casing axis and a second ring portion extending axially with respect to said tubular casing axis, said second ring portion being swaged to hold together said tubular body flange and said casing flange against said first annular portion.

18. The vibration isolating apparatus according to claim 4 wherein:
   said tubular casing has a casing flange extending radially outward with respect to said tubular casing axis at said second casing end;
   said elastic base body has a base body flange extending radially outward from said elastic base body and with respect to said tubular casing axis; and
   a fixing device fixes together said casing flange and said base body flange.

19. The vibration isolating apparatus according to claim 18 wherein said fixing device is an annular stepped member having a first annular portion extending radially with respect to said tubular casing axis and a second ring portion extending axially with respect to said tubular casing axis, said second ring portion being swaged to hold together said base body flange and said casing flange against said first annular portion.

20. A method for assembling a vibration isolating apparatus having an air chamber and first and second liquid chambers, comprising the steps of:
   providing a tubular casing having a tubular casing axis, a first casing end, a second casing end, a tubular casing inner surface, and a casing bottom closing said first casing end;
   providing a tubular body member having a first tubular body end, a second tubular body end, an outer tubular body surface, an inner tubular body surface, an elastic diaphragm sealing said first tubular body end, and said tubular body member defining an orifice and having said outer tubular body surface defining a groove extending from said orifice to said first tubular body end;
   providing a partition member having opposing first and second partition surfaces, said second partition surface having a partition peripheral portion having a concavity;
   disposing said partition member in said tubular body member, while within a gaseous environment, such that said partition member sealingly engages said inner tubular body surface to define an air chamber within said tubular body member and between said first partition surface and said elastic diaphragm, and said concavity is aligned with said orifice of said tubular body member;
   press-fitting, in a liquid environment, said tubular body, with said partitioning member fitted therein, into said tubular casing with said diaphragm entering said tubular casing first so as to form said first liquid chamber between said casing bottom and said diaphragm, and to form a conduit defined by said groove and said tubular casing inner surface, said conduit being for communicating said first liquid chamber with said second liquid chamber via said orifice;
   disposing, while within a liquid environment, an elastic base body having a base end with an end peripheral portion into said tubular body member to place said end peripheral portion in engaging contact with said partition periphery of said second partition surface to define said second liquid chamber between said partition member and said base end with said concavity defining an opening in conjunction with said end peripheral portion which permits said second liquid chamber to communicate via said orifice and said conduit with said first liquid chamber; and fixing together said tubular casing and said elastic base body with said tubular body member disposed therebetween.

21. The method of assembling the vibration isolating apparatus of claim 20 wherein said tubular body includes a rigid tubular reinforcement with elastic material covering at least an outer portion thereof and said groove being formed in said elastic material and said step of providing said tubular body includes forming said elastic material integrally with said diaphragm over said rigid tubular reinforcement.

* * * * *